UNITED STATES PATENT OFFICE.

WILHELM SCHUMACHER, OF OSNABRÜCK, GERMANY.

MANUFACTURE OF COHERENT BODIES FROM BLAST-FURNACE DUST.

933,270.

Specification of Letters Patent. Patented Sept. 7, 1909.

No Drawing. Application filed June 10, 1908. Serial No. 437,648.

*To all whom it may concern:*

Be it known that I, WILHELM SCHUMACHER, a subject of the Emperor of Germany, and a resident of Osnabrück, in the Kingdom of Prussia and Empire of Germany, have invented certain new and useful Improvements in the Manufacture of Coherent Bodies from Blast-Furnace Dust, of which the following is a specification.

My invention relates to processes in which blast furnace dust is agglomerated into coherent bodies in the form of briquets or otherwise.

The production of briquets from blast furnace dust presents great difficulties, partly on account of its great fineness and partly on account of the relatively small percentage of iron contained in the material. In briqueting blast furnace dust it has been the practice heretofore to use binders such as calcium silicate or blast furnace slag, but whenever any material is used as a binder which is also contained in the blast furnace dust as an ingredient or impurity, the admixture of such binder must not be in too great quantity since otherwise the percentage of iron in the briquet will become so low as to render the product worthless. I have discovered that blast furnace dust itself contains binding materials of a hydraulic character (such as hydraulic lime or cement) which result from the sintering in the heat of the blast furnace. These binding materials enable the blast furnace dust in a great many cases to harden by itself without any addition of other binding materials. This property is found in the highest degree with fresh blast furnace dust, but becomes less and less pronounced as the material ages and may be destroyed entirely by long exposure to air.

Under usual conditions even fresh blast furnace dust, if moistened with water and pressed to form blocks or the like, will harden very little or not at all. I have discovered, however, that the binding ingredients contained in the blast furnace dust may be rendered very active as it were by a catalytic action, if I add to the blast furnace dust certain more or less soluble salts, especially chlorids (except those of the alkalies) sulfates and sulfites, more particularly those of the alkaline earth metals and those of metals of the iron group. Instead of these salts I may employ the corresponding acids, such as sulfuric acid, sulfurous acid, hydrochloric acid, etc., as these will form the required salts with ingredients of the blast furnace dust, such as the iron contained therein. The addition of these catalytic agents causes the blast furnace dust to harden substantially like cement within a few hours, this process being often accompanied by a considerable evolution of heat. It will be well understood that these salts do not themselves form any compounds which act as binders for the mixture in any material degree, but their action is chiefly catalytic, that is they determine and stimulate the binding action of the materials contained in the blast furnace dust. The action of the several salts is not the same in all cases with every blast furnace dust. The particular salt, or mixture of salts and the amount of it to be used must be determined by experiment in each individual case. The addition of these catalytic agents varies from a fraction of 1% to about 4 or 5%. For reasons of economy it is advisable in many cases to use mixtures of salts such as are obtained as waste products in various industries, such as the potash industry, or the extraction of copper, or the manufacture of soda.

Most soluble salts have an advantageous influence on the hardening process of the blast furnace dust, but the chlorids of the alkalies have no action whatever and all salts and compounds of strongly alkaline character have a detrimental action.

It will be understood that I may add to the blast furnace dust, or to the mixture of blast furnace dust with salts, such as above defined, other binding materials. Such additional binding materials should never be of a strongly alkaline character, as this would impair the catalytic action of the salts. This is the reason that substances such as ordinary Portland cement should not be used, as it contains materials which will set free immediately or after a short time, considerable quantities of hydrate of lime. In all cases therefore in which binding materials containing lime are used, care should be taken to have the blast furance dust set or hardened entirely, or for the greater part before the formation of hydrate of lime. I have obtained good results with the addition of finely pulverized blast furnace slag of a character which causes it to harden slowly; I have also obtained good results by the admixture of very fine quartz, the mixture in each case being then moistened with water, formed into briquets by pressure and then treated with steam under pressure in a closed vessel. In the first mentioned case the lime which is set free as hydrate of lime by the hardening action of the steam on the blast furnace dust, exerts a hardening effect on the slag, which contains only a small percentage of lime. In the second case this lime, which is set free by the action of the steam, combines with the quartz to form silicate of lime, which is a very effective binder.

Instead of adding catalytic agents or salts to the blast furnace dust, I may obtain results similar in character, but not so good in degree, by warming or heating the finished products either in the open air, or by means of steam under pressure in a closed vessel. If the blast furnace dust itself has strong binding properties, other fine materials such as fine concentrates, pyritic waste, purple ore, etc. may be added, the blast furnace dust in this case serving as a binder.

It will of course be understood that I may carry out my process not only with the blast furnace dust obtained as a deposit in the smelting of iron ores, but to blast furnace dust obtained from other metallurgical processes, such as the production of copper.

I claim as my invention:

1. The herein described process of agglomerating blast furnace dust, which consists in mixing such dust with an agent, which, by catalytic influence stimulates the binding action of ingredients contained in the blast furnace dust, and then forming the mass into coherent bodies.

2. The herein described process of agglomerating blast furnace dust, which consists in mixing such dust with water and with an agent, which, by a catalytic influence stimulates the binding action of substances contained in the blast furnace dust, and then forming the mass into coherent bodies.

3. The herein described process of agglomerating blast furnace dust, which consists in mixing such dust with other fine material and with an agent, which, by a catalytic influence stimulates the binding action of ingredients contained in the blast furnace dust, and then forming the mass into coherent bodies.

4. The herein described process of agglomerating blast furnace dust, which consists in mixing such dust with a binding material and with an agent, which, by a catalytic influence stimulates the binding action of ingredients contained in the blast furnace dust, and then forming the mass into coherent bodies.

5. The herein described process of agglomerating blast furnace dust, which consists in mixing such dust with binding material, and with other material in a fine condition adapted to be agglomerated by such binder with the blast furnace dust, and with an agent which, by catalytic influence stimulates the binding action of ingredients contained in the blast furnace dust, and then forming the mixture into coherent bodies.

In witness whereof I have hereunto signed my name in the presence of two subscribing witnesses.

WILHELM SCHUMACHER.

Witnesses:
 HENRY HASPER,
 WOLDEMAR HAUPT.